(12) United States Patent
Lee et al.

(10) Patent No.: US 11,880,965 B2
(45) Date of Patent: Jan. 23, 2024

(54) SMARTPHONE FOR OBTAINING FOURIER PTYCHOGRAPHY IMAGE AND METHOD FOR OBTAINING FOURIER PTYCHOGRAPHY IMAGE USING SMARTPHONE

(71) Applicant: INDUSTRY-ACADEMIC COOPERATION FOUNDATION, YONSEI UNIVERSITY, Seoul (KR)

(72) Inventors: Seung Ah Lee, Seoul (KR); Kyung Chul Lee, Yongin-si (KR); Kyungwon Lee, Seoul (KR); Jaewoo Jung, Seoul (KR); Se Hee Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/671,513

(22) Filed: Feb. 14, 2022

(65) Prior Publication Data
US 2023/0014453 A1 Jan. 19, 2023

(30) Foreign Application Priority Data
Feb. 18, 2021 (KR) ........................ 10-2021-0021683

(51) Int. Cl.
*G06T 5/50* (2006.01)
*G02B 21/00* (2006.01)
(Continued)

(52) U.S. Cl.
CPC ............ *G06T 5/50* (2013.01); *G02B 21/0008* (2013.01); *G02B 21/06* (2013.01); *G02B 21/367* (2013.01);
(Continued)

(58) Field of Classification Search
CPC ......... G06T 5/50; G06T 5/001; G06T 7/0002; G06T 2207/10056; G06T 2207/10152;
(Continued)

(56) References Cited

U.S. PATENT DOCUMENTS

| 2014/0133702 A1* | 5/2014 | Zheng | B01L 3/508 |
|---|---|---|---|
| | | | 382/103 |
| 2014/0267670 A1* | 9/2014 | Tipgunlakant | G02B 21/082 |
| | | | 348/79 |

(Continued)

FOREIGN PATENT DOCUMENTS

KR 10-2082747 B1 2/2020

OTHER PUBLICATIONS

Zheng et al. "Wide-Field, high-resolution Fourier ptychographic microscopy" Nat Photonics. Sep. 1, 2013.*
(Continued)

*Primary Examiner* — James T Boylan

(57) ABSTRACT

A method for obtaining a Fourier ptychography image using a smartphone comprises the steps of: (a) sequentially providing illumination of different angles to the sample by sequentially displaying, according to a first pattern composed of point light sources at different positions, the point light sources of the first pattern on a display of the smartphone; (b) obtaining an image for each illumination angle of the sample using a camera of the smartphone whenever illumination of different angles is provided by the point light sources of the first pattern; and (c) restoring a first Fourier ptychography image using a plurality of images for each illumination angle obtained using the camera of the smartphone.

8 Claims, 8 Drawing Sheets

(51) Int. Cl.
  *G02B 21/06* (2006.01)
  *H04N 23/80* (2023.01)
  *H04N 23/56* (2023.01)
  *G02B 21/36* (2006.01)
  *G06T 5/00* (2006.01)
  *G06T 7/00* (2017.01)

(52) U.S. Cl.
  CPC ............ *G06T 5/001* (2013.01); *G06T 7/0002* (2013.01); *H04N 23/56* (2023.01); *H04N 23/80* (2023.01); *G06T 2207/10056* (2013.01); *G06T 2207/10152* (2013.01); *G06T 2207/30168* (2013.01); *H04M 2250/52* (2013.01)

(58) Field of Classification Search
  CPC .......... G06T 2207/30168; H04N 23/80; H04N 23/56; G02B 21/0008; G02B 21/06; G02B 21/367; H04M 2250/52
  See application file for complete search history.

(56) References Cited

U.S. PATENT DOCUMENTS

| | | | |
|---|---|---|---|
| 2017/0178317 A1* | 6/2017 | Besley | G06T 5/10 |
| 2017/0371141 A1* | 12/2017 | Besley | G06T 3/4076 |
| 2018/0203122 A1* | 7/2018 | Grauer | G01S 17/89 |
| 2018/0231761 A1* | 8/2018 | Dai | G02B 27/58 |
| 2018/0299376 A1* | 10/2018 | Cooper | G01N 31/22 |
| 2022/0046169 A1* | 2/2022 | Divitt | H04N 23/80 |

OTHER PUBLICATIONS

Wang et al. "Enhanced image reconstruction of ptychographic microscopy with double-height illumination" Optics Express. Dec. 6, 2021.*

Tomas Aidukas et al., "Miniature Fourier Ptychographic Microscope Using Mobile Phone Camera Sensors", DOI:10.1364/MICROSCOPY.2018.MTu4A2,2018.04.17.).

Pavan Chandra Konda et al., Fourier Ptychography: current applications and future promises, vol. 28, No. 7/Mar. 30, 2020/Optics Express 9603-9630, Mar. 19, 2020).

* cited by examiner

SMARTPHONE FOR OBTAINING FOURIER PTYCHOGRAPHY IMAGE AND METHOD FOR OBTAINING FOURIER PTYCHOGRAPHY IMAGE USING SMARTPHONE

CROSS-REFERENCE TO RELATED APPLICATIONS

This application claims priority under 35 U.S.C 119(a) to Korean Patent Application No. 10-2021-0021683, filed on Feb. 18, 2021, in the Korean Intellectual Property Office, the disclosure of which is incorporated herein in its entirety by reference.

BACKGROUND

1. Technical Field

The present disclosure relates to a smartphone and a method for obtaining image using a smartphone, more particularly to a smartphone for obtaining Fourier ptychography image and a method for obtaining Fourier ptychography image using a smartphone.

2. Description of the Related Art

Research to obtain a large area of a biological sample with high resolution is continuously being made. As is well known, a high-resolution image of a sample is obtained using a microscope, and in a general microscope, magnification and resolution are in inverse proportion to each other. The resolution of the image for the object information is determined according to the spatial bandwidth proportional to the numerical aperture of the microscope objective lens. Although the bandwidth can be widened by using an objective lens of a high numerical aperture, the magnification is also increased, so the observation area that can be photographed at once is reduced.

Meanwhile, Fourier ptychography image restoration technology is a technology for improving resolution by composing an optical system with an objective lens of a low magnification and low numerical aperture that can capture large-area images, obtaining multiple images by changing the incident angle of the illumination of the sample, and applying a restoration algorithm to the obtained multiple images.

In recent years, the demand is increasing for a simple and highly portable image acquisition device that can be used for experiments and pathological diagnosis in a limited environment. Although the Fourier ptychography image restoration technology can simultaneously improve the observation area and resolution, it requires a separate illumination device to obtain multiple images, and a separate camera and processor for image processing are required for Fourier ptychography image restoration.

SUMMARY

The present disclosure proposes a method capable of restoring a Fourier ptychography image at low cost without using a separate illumination device.

In addition, the present disclosure proposes a method for obtaining Fourier ptychography image using a smartphone capable of improving the quality of the Fourier ptychography image.

According to an aspect of the present disclosure, conceived to achieve the objectives above, there is provided a method for obtaining a Fourier ptychography image using a smartphone, in which a Fourier ptychography image of a sample is obtained by controlling the smartphone through an application installed on the smartphone, the method comprising the steps of: (a) sequentially providing illumination of different angles to the sample by sequentially displaying, according to a first pattern composed of point light sources at different positions, the point light sources of the first pattern on a display of the smartphone; (b) obtaining an image for each illumination angle of the sample using a camera of the smartphone whenever illumination of different angles is provided by the point light sources of the first pattern; and (c) restoring a first Fourier ptychography image using a plurality of images for each illumination angle obtained using the camera of the smartphone.

The point light sources of the first pattern include a first point light source displayed vertically aligned with the sample, and a plurality of point light sources are distributed in the first pattern around the first point light source.

The sizes of the plurality of point light sources distributed around the first point light source are set in proportion to a separation distance from the first point light source.

The first point light source has a circular shape, and shapes of a plurality of point light sources distributed around the first point light source are set based on a separation direction between the first point light source and the corresponding point light source.

Among the plurality of point light sources distributed around the first point light source, the point light source spaced apart from the first point light source in the horizontal direction has an elliptical shape having a major axis in the horizontal direction, and the point light source spaced apart from the first point light source in the vertical direction has an elliptical shape having a major axis in the vertical direction.

The method may further include the steps of: (d) repeating the steps (a) to (c) for a second pattern to an Nth pattern having a point light source position distribution different from the first pattern; (e) evaluating quality of the first to Nth Fourier ptychography images restored for each pattern; and (0 selecting a Fourier ptychography image of the best quality among the first to Nth Fourier ptychography images.

According to another aspect of the present disclosure, there is provided a smartphone for obtaining a Fourier ptychography image of a sample in combination with an optical system device, the smartphone comprising: a display control module configured to sequentially provide illumination of different angles to the sample by sequentially displaying, according to a first pattern of point light sources at different positions, the point light sources of the first pattern on a display; an image acquisition module for obtaining an image for each illumination angle of the sample by using a camera whenever illumination of different angles is provided by the point light sources of the first pattern; and a Fourier ptychography image restoration module for restoring a first Fourier ptychography image using a plurality of images for each illumination angle obtained using the camera.

According to the present disclosure, there is an advantage of being able to restore a Fourier ptychography image at low cost without using a separate illumination device, and to improve the quality of a Fourier ptychography image through a high degree of freedom.

DETAILED DESCRIPTION

Figure 1:
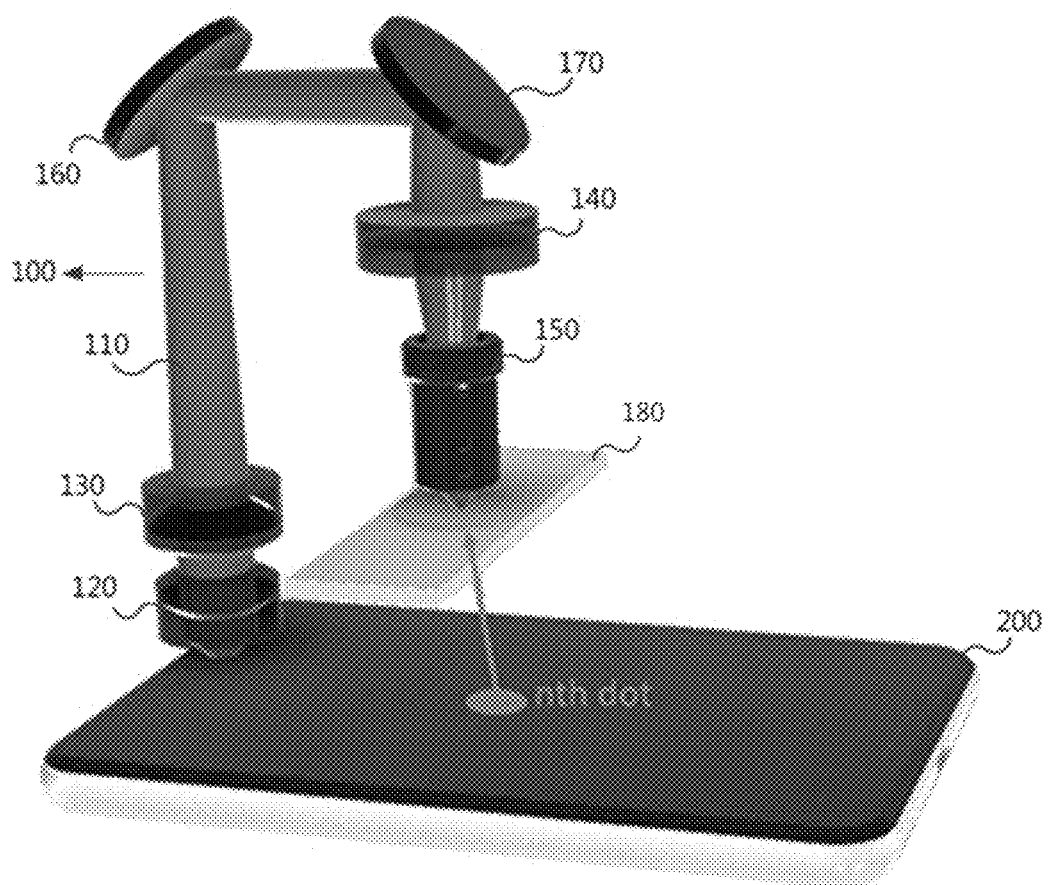
FIG. 1 shows a structure of a microscope system for obtaining a Fourier ptychography image according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
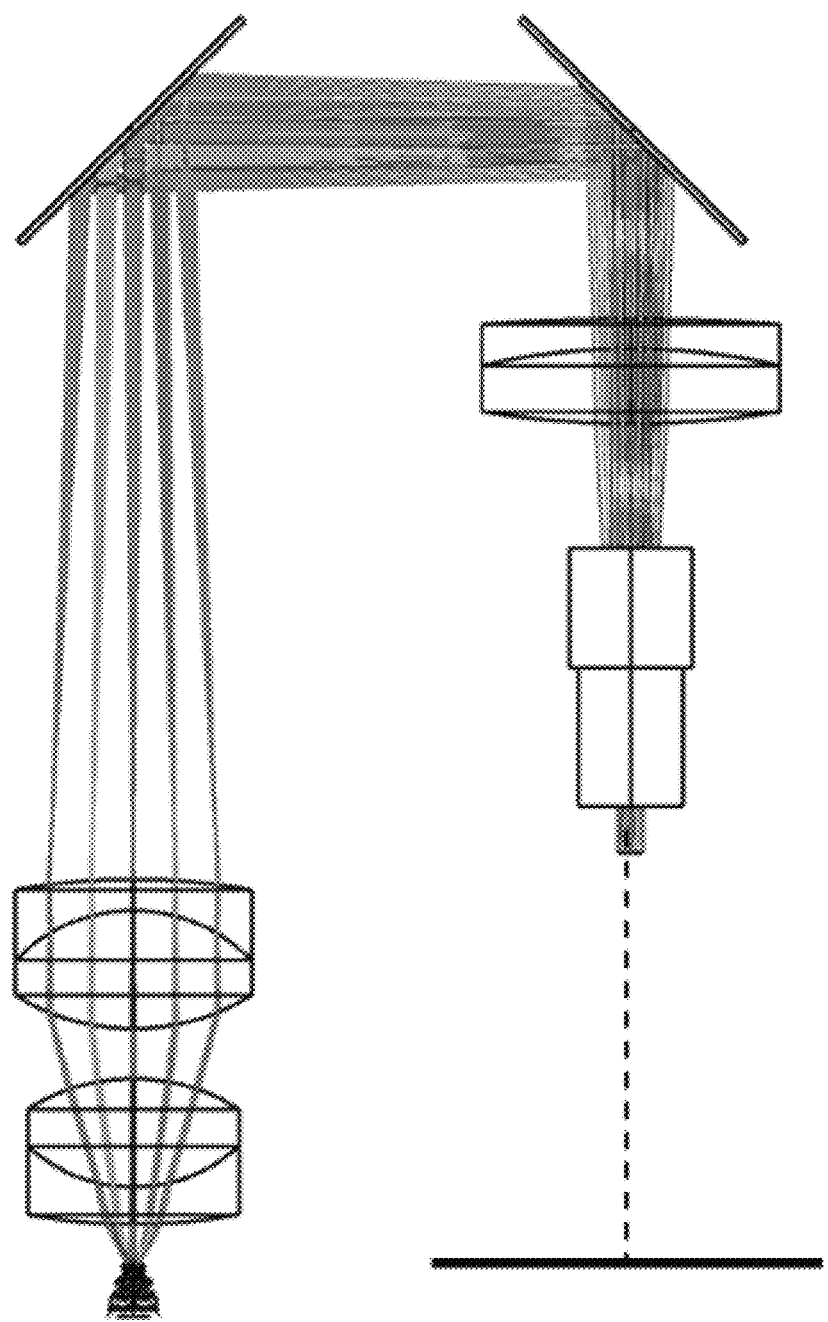
FIG. 2 shows an optical path of a microscope system according to an embodiment of the present disclosure.

FIG. 1 shows a structure of a microscope system for obtaining a Fourier ptychography image according to an embodiment of the present disclosure, and FIG. 2 shows an optical path of a microscope system according to an embodiment of the present disclosure.

Referring to FIG. 1, a microscope system for obtaining a Fourier ptychography image according to an embodiment of the present disclosure includes an optical system device 100 and a smartphone 200.

The optical system device 100 has an optical structure for providing an image of the sample to the smartphone 200.

The smartphone 200 is coupled to the optical system device 100, provides illumination to the optical system device 100, and obtains images of a sample from the optical system device 100. The smartphone 200 restores a Fourier ptychography image by using the obtained images of the sample.

The optical system device 100 includes a light path portion 110, a plurality of lenses 120, 130, 140 and 150, a plurality of mirrors 160 and 170, and a sample holder 180.

On the sample holder 180, a sample is placed. The sample holder 180 is made of a transparent material, and illumination for the sample is provided from the smartphone 200. The conventional illumination for obtaining a Fourier ptychography image was provided using a separate illumination system including a plurality of LEDs and a control device for controlling the luminescence of the plurality of LEDs. Since the illumination is provided through an illumination system including a control device and a plurality of LEDs, the conventional Fourier ptychography image acquisition requires high cost.

In the present disclosure, a display of the smartphone 200 is used as a light source for providing illumination and does not require a separate illumination system. Due to this structure, the existing high cost problem can be solved.

The smartphone 200 displays an image on a display by causing OLED to emit light, and the present disclosure is to utilize the OLED constituting the display of the smartphone as illumination for obtaining a Fourier ptychography image.

However, in order to obtain a Fourier ptychography image, illumination must be provided from a plurality of angles. Control of the display screen of the smartphone display for providing such illumination will be described with reference to a separate drawing.

A first end of the optical system device 100 is coupled to the smartphone 200, particularly to the camera of the smartphone 200. The light path portion 110 of the optical system device 100 provides an optical path such that an image of the sample to which illumination is provided is captured by the camera of the smartphone 200.

Referring to FIG. 1, the light path portion 110 has a 'ㄷ'-shaped structure that is bent twice, but this is an example, and it will be apparent to those skilled in the art that the structure of the light path portion 110 may have a different structure.

At bending points of the light path portion 110, mirrors 160 and 170 are installed to reflect light by illumination so that the light can be transmitted along the light path portion. In the embodiment shown in FIG. 1, since the light path portion 110 has a structure in which it is bent twice, there is shown a case in which two mirrors 160 and 170 are used, however, the number of mirrors used may be variously changed according to the structure of the light path portion 110.

A plurality of lenses 120, 130, 140 and 150 are coupled to the light path portion 110, and the lenses function to adjust a focal length between a sample and a camera of the smartphone 200 and focus diffused light.

In the present disclosure, since an image is obtained using a camera pre-installed in a smartphone and a display of the smartphone is used as illumination, a Fourier ptychography image can be obtained in a simplified manner and at low cost.

In the smartphone 200, an application for controlling the smartphone 200 is installed to obtain a Fourier ptychography image. A detailed structure of the application installed on the smartphone and an operation of the smartphone 200 by the application will be described with reference to a separate drawing.

Figure 3A:
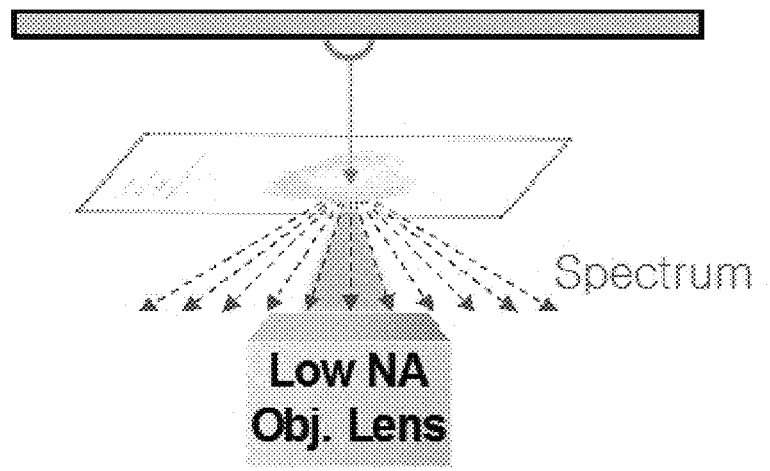
FIGS. 3A and 3B are a conceptual diagram illustrating a conventional image acquisition structure for Fourier ptychography image restoration.
Figure 3B:
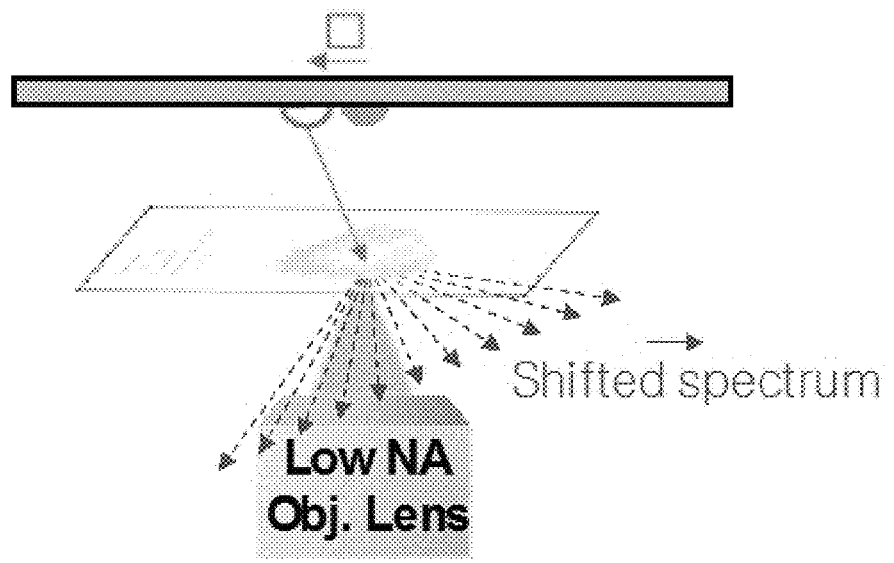

FIGS. 3A and 3B are a conceptual diagram illustrating a conventional image acquisition structure for Fourier ptychography image restoration.

Referring to FIGS. 3A and 3B, conventionally, illumination was provided using an illumination system including a plurality of LEDs.

In order to restore a Fourier ptychography image, it is necessary to have a plurality of images illuminated from different angles.

FIG. 3A shows a case in which a central LED among a plurality of LEDs emits light and the other LEDs are in an off state.

FIG. 3B shows a case in which an LED adjacent to a left of a central LED among a plurality of LEDs emits light and the other LEDs are in an off state.

As shown in FIGS. 3A and 3B, in order to obtain a Fourier ptychography image, by emitting LEDs in different positions one by one, illumination is provided from different angles, and images are obtained one by one according to each illumination angle.

When a preset number of images are obtained at different illumination angles, Fourier ptychography image restoration is performed using the obtained images. Since a plurality of images illuminated at different illumination angles are required, the illumination system for Fourier ptychography image restoration requires a plurality of LEDs arranged in different positions, and requires a control device for controlling light emission and off of such LEDs.

As described above, in the present disclosure, a display of a smartphone 200 performs the role of the illumination system shown in FIG. 3, and the image acquisition and ptychography image restoration are also performed in the smartphone 200.

Figure 4:
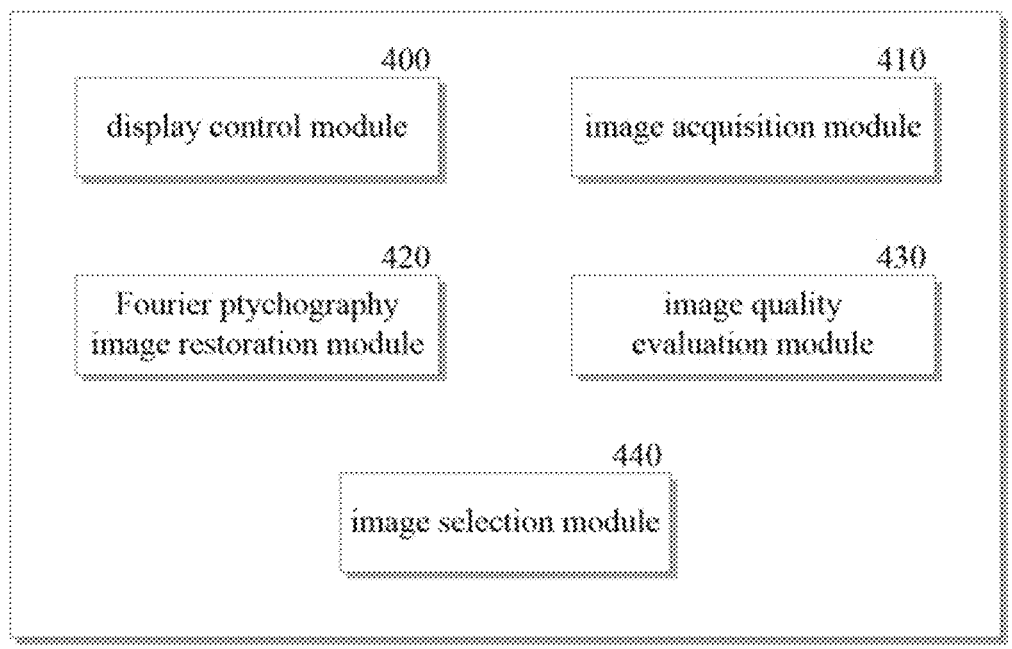
FIG. 4 is a block diagram illustrating a module configuration of an application installed in a smartphone for obtaining a Fourier ptychography image according to an embodiment of the present disclosure.

FIG. 4 is a block diagram illustrating a module configuration of an application installed in a smartphone for obtaining a Fourier ptychography image according to an embodiment of the present disclosure.

Referring to FIG. 4, an application installed in a smartphone for obtaining a Fourier ptychography image according to an embodiment of the present disclosure includes a display control module 400, an image acquisition module 410, a Fourier ptychography image restoration module 420, an image quality evaluation module 430 and an image selection module 440.

The display control module 400 controls the display of the smartphone such that only a selected region of the display of the smartphone emits light and LEDs of the remaining regions of the display are turned off to form a point light source.

The display control module 400 provides illumination at different angles to the sample while changing a position of the point light source based on a preset pattern. Since the illumination angles required to obtain a Fourier ptychography image are preset, and the height between the smartphone display and the sample is preset, it is possible to provide illumination at a required angle by adjusting the position where the point light source is formed on the display.

According to a preferred embodiment of the present disclosure, a pattern in which the positions of the point light sources are set is stored in advance, and the point light sources are sequentially displayed on the display at different positions according to the pattern.

Figure 5:
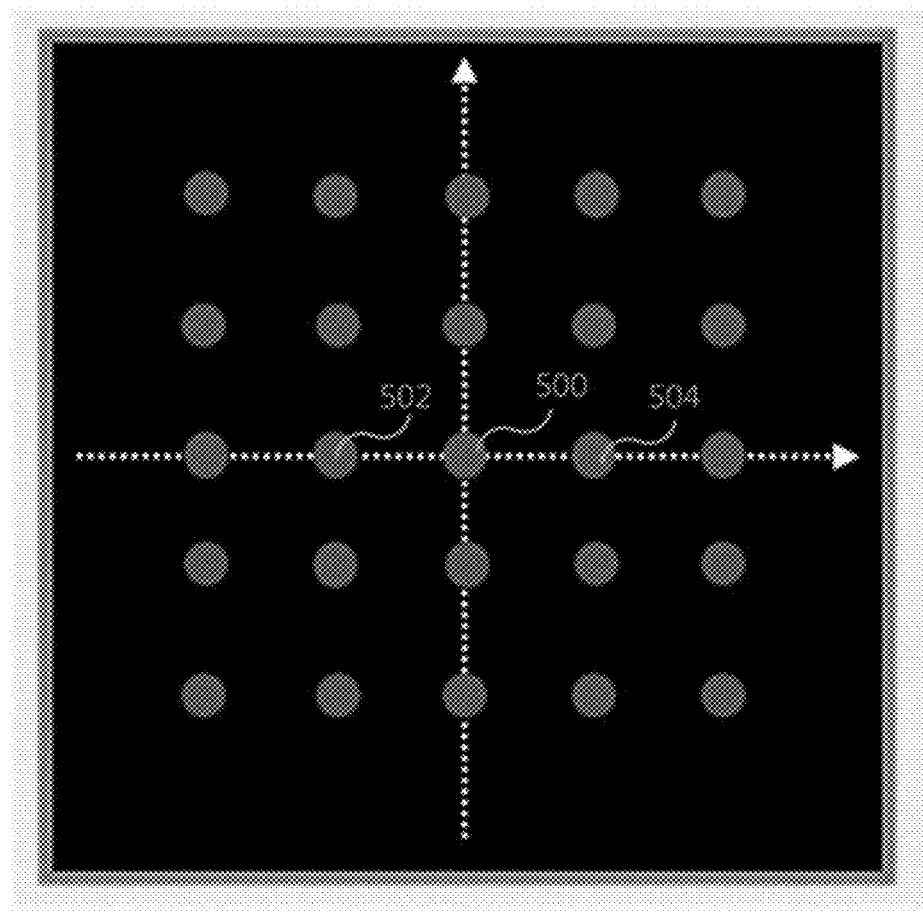
FIG. 5 shows an example of a point light source pattern displayed on a display according to a first embodiment of the present disclosure.

FIG. 5 shows an example of a point light source pattern displayed on a display according to a first embodiment of the present disclosure.

Referring to FIG. 5, a plurality of point light sources formed on a display are shown, and the point light sources shown in FIG. 5 are displayed one by one according to a preset time interval. Of course, if necessary, multiple point light sources may be displayed simultaneously. A first point light source 500 formed in a center of the point light sources in FIG. 5 is a point light source formed at a position vertically aligned with a sample placed on a sample holder, and is a point light source providing vertical illumination.

In order to provide illumination from various angles, a plurality of point light sources are arranged at regular intervals on the top, bottom, left, and right sides around the first point light source 500 formed in the center.

The display control module 400 in FIG. 4 forms point light sources according to the pattern shown in FIG. 5 at preset time intervals. For example, the display control module 400 controls the display such that the first point light source 500 formed in the center is primarily formed, and then maintains the first point light source 500 formed in the center for a certain amount of time, and then controls the display such that a second point light source 502 adjacent to the left side of the point light source 500 formed in the center is secondarily formed. After the second point light source 502 is maintained for a certain amount of time, a third point light source 504 adjacent to the right side of the first point light source 500 is controlled to be formed.

The display control module 400 activates all the point light sources included in the pattern at a preset time interval according to a pre-determined order. A total of 25 point light sources are shown in FIG. 5, and an operation of controlling the display to activate a specific point light source is performed 25 times.

The image acquisition module 410 controls the camera of the smartphone 200 to obtain, whenever a point light source is formed according to the pattern, an image influenced by the point light source.

For example, the image acquisition module 410 controls the camera of the smartphone to obtain a first image, when the first point light source 500 shown in FIG. 5 is formed on the display and provide illumination, and controls the camera of the smartphone to obtain a second image, when after the first point light source 500 is deactivated, the second point light source 502 is formed on the display and provide illumination. This image acquisition is performed whenever a specific point light source is activated according to a pattern, and in the case of a pattern consisting of a total of 25 point light sources as shown in FIG. 5, the image acquisition module 410 obtains 25 images. Since the positions of the 25 point light sources are different, the image acquisition module 410 obtains 25 images by receiving illumination from 25 different angles.

The image acquisition module 410 controls the camera to obtain a plurality of images for each illumination angle, and the images for each illumination angle obtained in the camera through the image acquisition module 410 are provided to the Fourier ptychography image restoration module 420.

The Fourier ptychography image restoration module 420 restores a Fourier ptychography image by using the plurality of images for each illumination angle obtained through a camera of a smartphone.

In an optical system, a bandwidth of an image acquisition system is determined according to a numerical aperture of an objective lens, and a resolution of an obtained image is determined in proportion to the bandwidth. In addition, a central axis of the bandwidth changes according to an irradiation angle of the point light source. When an i-th image is taken, when the irradiation angle from an x-axis is $\alpha_i$ and the irradiation angle from a y-axis is $\beta_i$, the central axis of the bandwidth with respect to the spatial frequency of an object moves in parallel in proportion to the values of $\sin(\alpha_i)$ and $\sin(\beta_i)$. As the central axis of the bandwidth moves, each image contains information about the different spatial frequencies of the object. Fourier ptychography image restoration is to restore high-resolution object information of a wider synthesis bandwidth by applying an image quality enhancement algorithm called iterative phase retrieval using the information. In this case, the improvement of the synthesis bandwidth is determined according to the maximum irradiation angle, and the degree of restoration varies according to the scanning pattern.

Meanwhile, according to an embodiment of the present disclosure, a Fourier ptychography image may be restored using a plurality of patterns. For example, the Fourier ptychography image restoration module 420 restores a first Fourier ptychography image by obtaining images for each illumination angle according to the pattern shown in FIG. 5. After the first Fourier ptychography image is restored, a second Fourier ptychography image is restored by obtaining images for each illumination angle according to a pattern different from the pattern shown in FIG. 5 (a pattern having different positions of point light sources). In this way, the Fourier ptychography image restoration module 420 may restore a plurality of Fourier ptychography images for a plurality of patterns.

Meanwhile, the pattern may have different shapes and colors of the point light sources as well as the positions of the point light sources. Various shapes of the point light source as well as the circular shape and elliptical shape described above may be applied to the point light source, and the point light source of each pattern may be set to a different color.

The image quality evaluation module 430 evaluates an image quality of each Fourier ptychography image when a plurality of Fourier ptychography images are restored using a plurality of patterns. The image quality evaluation module 430 may be performed using a previously known image quality evaluation algorithm, and since image quality evaluation is a general technique, a detailed description thereof will be omitted. The image quality evaluation module 430 may evaluate the quality of each Fourier ptychography image in a manner such as a rating or a score.

After a plurality of Fourier ptychography images are restored using a plurality of patterns and the quality of each Fourier ptychography image is evaluated, the image selection module 440 selects a Fourier ptychography image having the best image quality, and outputs the selected image as a final image.

When illumination of a specific angle is provided using an illumination system as in the prior art, there is a restriction on the degree of freedom for freely changing the pattern. However, since the present disclosure uses a display of a smartphone as an illumination for Fourier ptychography image restoration, there is no restriction on the degree of freedom for changing the pattern of the point light source, so it is possible to use a plurality of patterns. In addition, since a Fourier ptychography image providing the highest image quality can be selected among the plurality of patterns, the Fourier ptychography image restoration performance can be improved.

Figure 6:
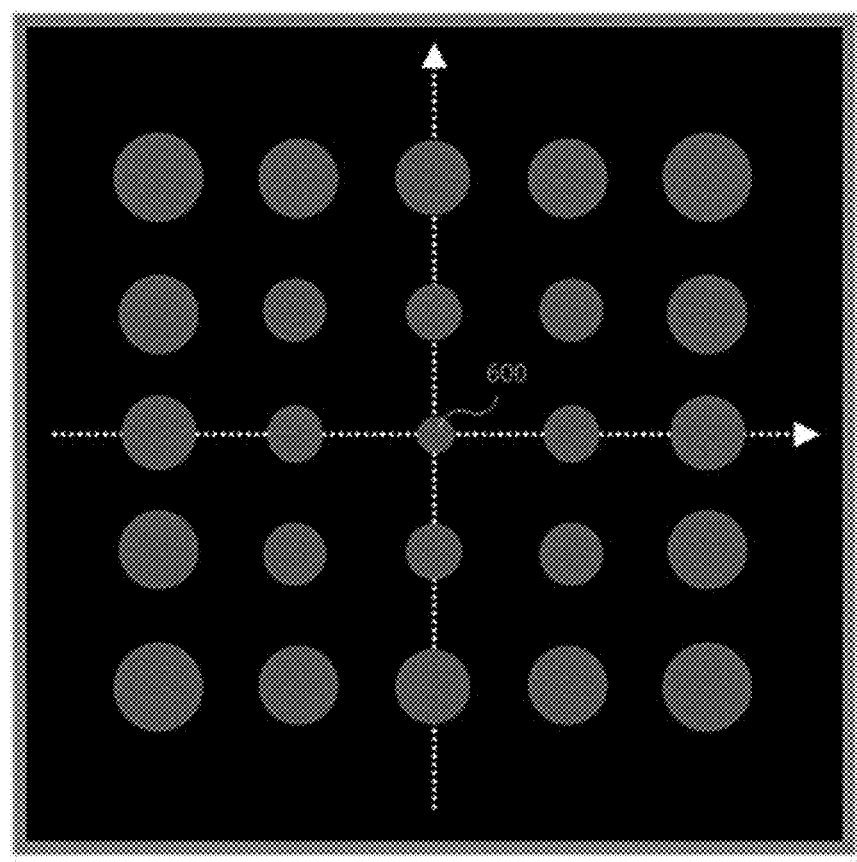
FIG. 6 shows an example of a point light source pattern displayed on a display according to a second embodiment of the present disclosure.

FIG. 6 shows an example of a point light source pattern displayed on a display according to a second embodiment of the present disclosure.

In the point light source pattern according to the first embodiment described with reference to FIG. 5, the size of each of the plurality of point light sources was the same. However, in the point light source pattern according to the second embodiment shown in FIG. 6, the size of each point light source is not the same.

In FIG. 6, a fourth point light source 600 located in the center is a point light source formed at a position vertically aligned with a sample. The fourth point light source 600 has the smallest size compared to other point light sources, and the other point light sources have a relatively larger size than the fourth point light source 600.

Referring to FIG. 6, the size of each of the plurality of point light sources may be determined based on a distance from the fourth point light source 600 located in the center. Point light sources far from the fourth point light source 600 have a relatively large size, and point light sources close to the fourth point light source 600 have a relatively small size.

Since the position of each point light source is different, the distance of the sample from the point light source is also different. According to the study of the inventors of the present disclosure, better Fourier ptychography image restoration is possible when illumination angles are different for accurate Fourier ptychography restoration but the same intensity of illumination is provided. To this end, in the pattern according to the second embodiment of the present disclosure, the size of each point light source is determined in consideration of the distance from the sample, and the size of the point light sources is set such that the fourth point light source 600 closest to the sample has the smallest size, and the size of the point light sources gradually increases as the distance from the fourth point light source 600 increases.

Such adjustment of the size of the point light source is an advantage of the present disclosure, which is difficult to be applied in a method using an existing physical illumination system, and by adjusting the size of the point light sources, uniform intensity of illumination can be provided despite the difference in distance, so that better Fourier ptychography image restoration becomes possible.

Figure 7:
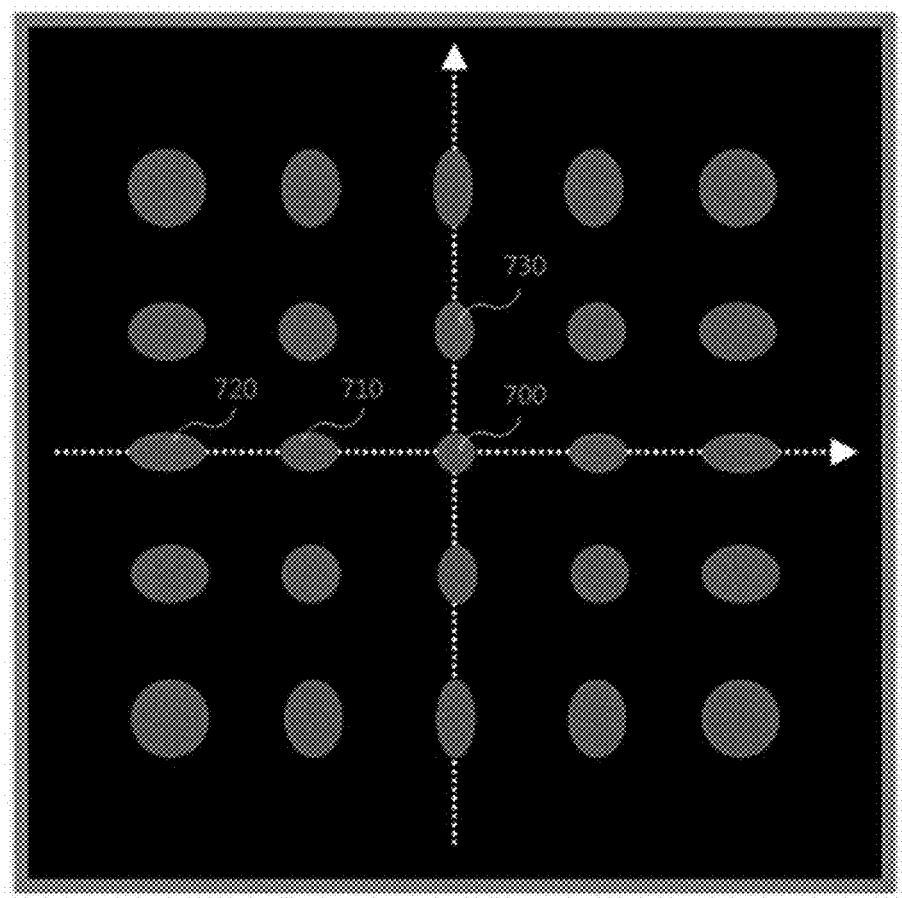
FIG. 7 shows an example of a point light source pattern displayed on a display according to a third embodiment of the present disclosure.

FIG. 7 shows an example of a point light source pattern displayed on a display according to a third embodiment of the present disclosure.

Referring to FIG. 7, a fifth point light source 700 located in the center is a point light source formed at a position vertically aligned with a sample, and the fifth point light source 700 has a circular size and has the smallest size compared to other point light sources.

In the pattern according to the third embodiment, not only the sizes of the point light sources are set differently, but also the shapes are set differently. At least some of the point light sources other than the fifth point light source 700 have an elliptical shape.

The shape and size of the point light sources are determined based on the separation direction and the separation distance from the fifth point light source 700.

As in the second embodiment, point light sources relatively far from the fourth point light source 600 have a relatively large size, and point light sources located relatively close to the fourth point light source 600 have a relatively small size.

Referring to FIG. 7, the shapes of the point light sources are determined based on the separation direction from the fifth point light source 700. A sixth point light source 710 spaced apart from the fifth point light source 700 in a first direction (horizontal direction) has an elliptical shape having a major axis in the first direction. A seventh point light source 720 spaced apart from the fifth point light source 700 in the first direction and located at a relatively greater distance from the fifth point light source 700 than the sixth point light source 710 has an elliptical shape having a major axis in the first direction, and has a longer major axis compared to the sixth point light source 710.

Meanwhile, a eighth point light source 730 spaced apart from the fifth point light source 700 in a second direction (vertical direction) orthogonal to the first direction (horizontal direction) has an elliptical shape having a major axis in the second direction.

The reason for setting the shape of the point light sources in consideration of the separation direction from the fifth point light source 700 is that when the shape of the point light source is set in an elliptical shape in consideration of the separation direction, it is suitable to provide illumination of uniform intensity for each point light source.

In the present disclosure, since point light sources are formed using a display of a smartphone, the size and shape can be freely adjusted, and through this degree of freedom, more uniform intensity of illumination can be provided for each angle, so that a better Fourier ptychography image can be restored compared to the case of using a physical illumination system.

Figure 8:
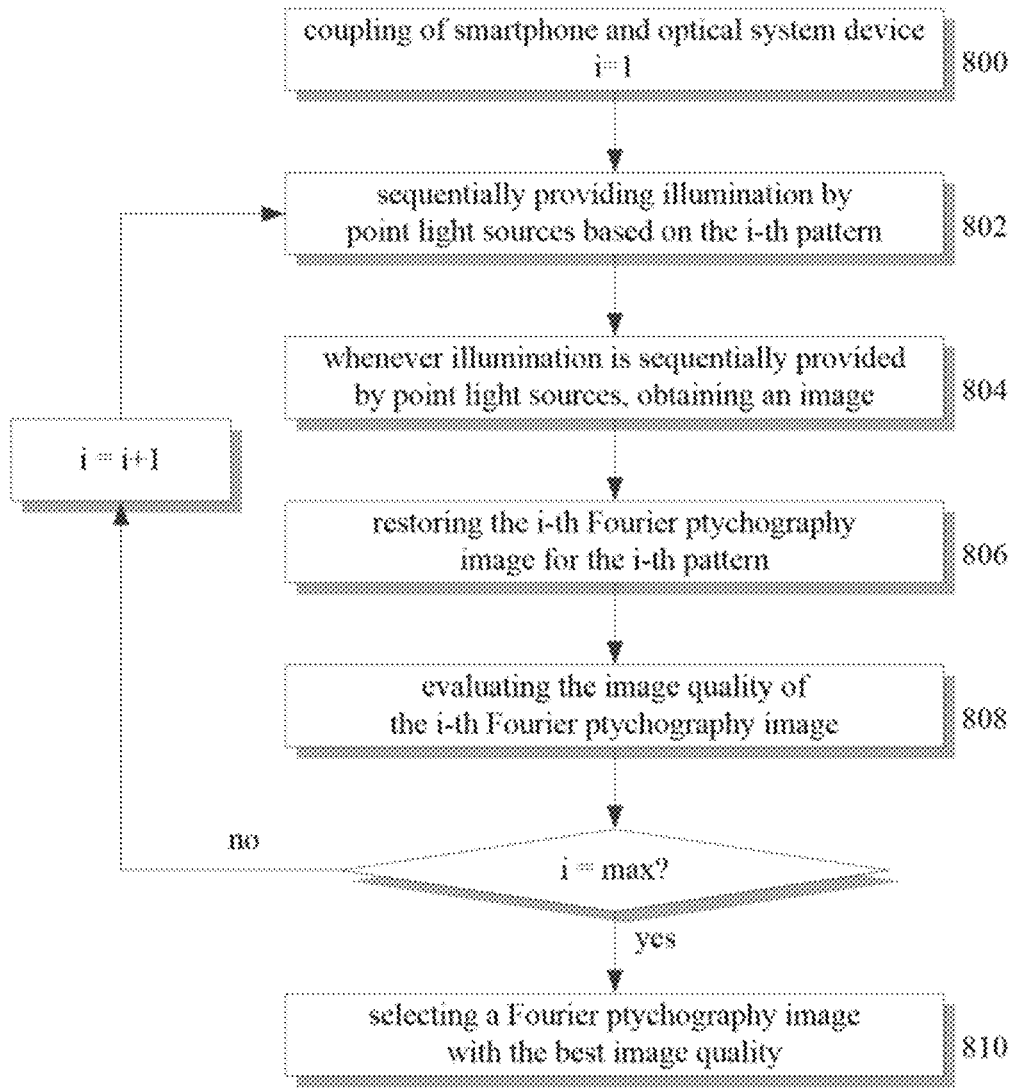
FIG. 8 is a flowchart illustrating an overall flow of a method for obtaining a Fourier image using a smartphone according to an embodiment of the present disclosure.

FIG. 8 is a flowchart illustrating an overall flow of a method for obtaining a Fourier image using a smartphone according to an embodiment of the present disclosure.

First, a smartphone 200 on which an application is installed is coupled with an optical system device 100 (step 800). As shown in FIG. 1, the smartphone 200 is positioned under the optical system device 100 and a camera of the smartphone 200 is coupled to a light path portion of the optical system device 100. A display of the smartphone 200 and a sample holder are positioned to face each other, so that the smartphone 200 is coupled to the optical system device 100 so as to provide illumination to the sample through the display of the smartphone 200.

After the smartphone 200 and the optical system device 100 are coupled, the application installed on the smartphone sequentially provides illumination by the point light sources based on the first preset pattern (step 802).

As in the first embodiment described above, illumination at different angles is provided while sequentially activating point light sources at different positions included in the pattern according to preset time intervals.

As in the second embodiment and the third embodiment, other point light sources may have different sizes and shapes compared to the first point light source aligned vertically with the sample, and it is preferable to set the size and shape of each point light source such that illumination of uniform intensity can be provided even when illumination is provided by point light sources at different positions.

Whenever illumination is sequentially provided by point light sources in step 802, the smartphone is controlled to obtain an image for each illumination angle through the camera of the smartphone (step 804).

After a plurality of images are obtained for each illumination angle, a first Fourier ptychography image is restored using the obtained images for each illumination angle (step 806).

After the first Fourier ptychography image is restored, the image quality of the restored first Fourier ptychography image is evaluated (step 808).

The steps 802 to 808 above are repeatedly performed for N patterns prepared in advance, N Fourier ptychography images are restored by restoring a Fourier ptychography image for each pattern, and the image quality is evaluated for each Fourier ptychography image.

After the image quality is evaluated for each Fourier ptychography image, a Fourier ptychography image with the best image quality is selected (step 810).

A method according to the present disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A method for obtaining a Fourier ptychography image using a smartphone, in which a Fourier ptychography image of a sample is obtained by controlling the smartphone through an application installed on the smartphone, the method comprising the steps of:
    (a) sequentially providing illumination of different angles to the sample by sequentially displaying each of point light sources, according to a first pattern composed of the point light sources at different positions, wherein the point light sources of the first pattern are formed using a display of the smartphone;
    (b) obtaining an image for each illumination angle of the sample using a camera of the smartphone whenever illumination of different angles is provided by the point light sources of the first pattern;
    (c) restoring a first Fourier ptychography image using a plurality of images for each illumination angle obtained using the camera of the smartphone;
    (d) repeating the steps (a) to (c) for a second pattern of point light sources to an Nth pattern of point light sources, wherein the first pattern to the Nth pattern are different from each other in sizes of point light sources distributed around a first point light source which is the nearest point light source to the sample, by adjusting sizes of point light sources of the second pattern to Nth pattern by using the display of the smartphone;
    (e) evaluating quality of the first to Nth Fourier ptychography images restored for each pattern; and
    (f) selecting a Fourier ptychography image of the best quality among the first to Nth Fourier ptychography images,
    wherein the point light sources of the first pattern include the first point light source displayed vertically aligned with the sample, and a plurality of point light sources are distributed in the first pattern around the first point light source,
    wherein the sizes of the plurality of point light sources distributed around the first point light source for each of the first to Nth pattern, are set bigger than the size of the first point light source in proportion to a separation distance from the first point light source.

2. The method for obtaining a Fourier ptychography image using a smartphone according to claim 1, wherein the first point light source has a circular shape, and shapes of the plurality of point light sources distributed around the first point light source are set based on a separation direction between the first point light source and the corresponding point light source.

3. The method for obtaining a Fourier ptychography image using a smartphone according to claim 2,
wherein among the plurality of point light sources distributed around the first point light source, the point light source spaced apart from the first point light source in the horizontal direction has an elliptical shape having a major axis in the horizontal direction, and the point light source spaced apart from the first point light source in the vertical direction has an elliptical shape having a major axis in the vertical direction.

4. The method for obtaining a Fourier ptychography image using a smartphone according to claim 1,
wherein the first pattern to the Nth pattern are different in at least one of a shape or a color of the point light sources.

5. A smartphone for obtaining a Fourier ptychography image of a sample in combination with an optical system device, the smartphone comprising:
a display control module configured to sequentially provide illumination of different angles to the sample by sequentially displaying each of point light sources, according to a first pattern composed of the point light sources at different positions, wherein the point light sources of the first pattern are formed using a display of the smartphone;
an image acquisition module for obtaining an image for each illumination angle of the sample by using a camera of the smartphone whenever illumination of different angles is provided by the point light sources of the first pattern; and
a Fourier ptychography image restoration module for restoring a first Fourier ptychography image using a plurality of images for each illumination angle obtained using the camera,
wherein the point light sources of the first pattern include a first point light source displayed vertically aligned with the sample, and a plurality of point light sources are distributed in the first pattern around the first point light source,
wherein the display control module controls the display for a second pattern of point light sources to an Nth pattern of point light sources, so that the first pattern to the Nth pattern are different from each other in sizes of point light sources distributed around the first point light source which is the nearest point light source to the sample,
wherein the image acquisition module obtains an image for each illumination angle with respect to the second pattern to the Nth pattern, and the Fourier ptychography image restoration module additionally restores second to Nth Fourier ptychography images with respect to the second pattern to the Nth pattern,
the smartphone further comprising:
an image quality evaluation module for evaluating image quality of the first to Nth Fourier ptychography images restored for each pattern; and
an image selection module for selecting a Fourier ptychography image of the best quality from among the first to Nth Fourier ptychography images,
wherein the sizes of the plurality of point light sources distributed around the first point light source for each of the first to Nth pattern are set bigger than the size of the first point light source in proportion to a separation distance from the first point light source.

6. The smartphone for obtaining a Fourier ptychography image according to claim 5,
wherein the first point light source has a circular shape, and shapes of the plurality of point light sources distributed around the first point light source are set based on a separation direction between the first point light source and the corresponding point light source.

7. The smartphone for obtaining a Fourier ptychography image according to claim 6,
wherein among the plurality of point light sources distributed around the first point light source, the point light source spaced apart from the first point light source in the horizontal direction has an elliptical shape having a major axis in the horizontal direction, and the point light source spaced apart from the first point light source in the vertical direction has an elliptical shape having a major axis in the vertical direction.

8. The smartphone for obtaining a Fourier ptychography image according to claim 7,
wherein the first pattern to the Nth pattern are different in at least one of a shape or a color of the point light sources.

* * * * *